(12) United States Patent
Hirayama

(10) Patent No.: US 10,087,822 B2
(45) Date of Patent: Oct. 2, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Yuki Hirayama, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 107 days.

(21) Appl. No.: 15/175,221

(22) Filed: Jun. 7, 2016

(65) Prior Publication Data

US 2016/0363043 A1 Dec. 15, 2016

(30) Foreign Application Priority Data

Jun. 9, 2015 (JP) .................. 2015-116733

(51) Int. Cl.
| | | |
|---|---|---|
| F02D 23/00 | (2006.01) | |
| F02B 37/007 | (2006.01) | |
| F02D 41/10 | (2006.01) | |
| F02B 37/04 | (2006.01) | |
| F02B 37/14 | (2006.01) | |
| F02B 39/10 | (2006.01) | |
| F02D 41/00 | (2006.01) | |
| F02B 33/40 | (2006.01) | |
| F02B 37/12 | (2006.01) | |

(52) U.S. Cl.
CPC .......... *F02B 37/007* (2013.01); *F02B 33/40* (2013.01); *F02B 37/04* (2013.01); *F02B 37/14* (2013.01); *F02B 39/10* (2013.01); *F02D 41/0007* (2013.01); *F02D 41/10* (2013.01); *F02B 2037/125* (2013.01); *F02D 2250/21* (2013.01); *Y02T 10/144* (2013.01)

(58) Field of Classification Search
CPC ....... F02B 37/013; F02B 37/007; F02B 37/04
USPC .................... 60/602, 612; 123/562
See application file for complete search history.

(56) References Cited

U.S. PATENT DOCUMENTS

2012/0079823 A1 4/2012 Son et al.

FOREIGN PATENT DOCUMENTS

| JP | 2004-278430 A | 10/2004 |
|---|---|---|
| JP | 2005054612 A | 3/2005 |
| JP | 2007-077854 A | 3/2007 |
| JP | 2008-190412 A | 8/2008 |
| JP | 2010-048225 A | 3/2010 |

*Primary Examiner* — Ngoc T Nguyen
(74) *Attorney, Agent, or Firm* — Hunton Andrews Kurth LLP

(57) ABSTRACT

A control apparatus is configured, after a torque increase request to increase an engine torque is made, to perform an air supply operation using an electric compressor where it is predicted that a pressure ratio of a turbo-compressor will become less than 1 after a throttle valve is opened accompanying the torque increase request, and, on the other hand, not to perform the air supply operation where it is predicted that the pressure ratio will not become less than 1 after the throttle valve is opened.

7 Claims, 6 Drawing Sheets

AA: without pressure loss in turbo
BB: with pressure loss in turbo

CONTROL APPARATUS FOR INTERNAL COMBUSTION ENGINE

CROSS-REFERENCE TO RELATED APPLICATION

The present application claims priority to Japanese Patent Application No. 2015-116733 filed on Jun. 9, 2015, which is incorporated herein by reference in its entirety.

BACKGROUND

Technical Field

Embodiments of the invention relate to a control apparatus for an internal combustion engine, and more particularly to a control apparatus for an internal combustion engine that is suitable as an apparatus for controlling an internal combustion engine in which a turbo-compressor of a turbocharger and an electric compressor are arranged in parallel in an intake passage.

Background Art

In Japanese Patent Laid-Open No. 2007-077854, a supercharging system is disclosed which includes a turbocharger and an electric compressor that are arranged in parallel in an intake passage of an internal combustion engine. The aforementioned supercharging system is configured so that, when an actual intake air flow rate of the internal combustion engine is insufficient, the electric compressor is operated at a speed required to compensate for a difference between the actual intake air flow rate and a target intake air flow rate.

LIST OF RELATED ART

Following is a list of patent documents which the applicant has noticed as related arts of the present invention.
[Patent Document 1]
  Japanese Patent Laid-Open No. 2007-077854
[Patent Document 2]
  Japanese Patent Laid-Open No. 2008-190412
[Patent Document 3]
  Japanese Patent Laid-Open No. 2010-048225
[Patent Document 4]
  Japanese Patent Laid-Open No. 2004-278430

Technical Problem

Under circumstances in which a difference between an actual intake air flow rate and a target intake air flow rate is recognized, if a configuration is adopted so that an air flow rate corresponding to the difference is always additionally supplied by an electric compressor, as in the technique described in Japanese Patent Laid-Open No. 2007-077854, there is a concern that even though the response of the engine torque (acceleration response of the vehicle) can be raised, the power consumption will increase.

On the other hand, if the speed of a turbo-compressor is in a low state when a throttle valve is opened upon a torque increase request being made, there is a possibility that, due to an increase in the intake air flow rate in response to opening of the throttle valve, a pressure ratio (=outlet pressure/inlet pressure) of the turbo-compressor will become less than 1. If the pressure ratio of the turbo-compressor becomes less than 1, the turbo-compressor will function as a restrictor in the intake passage and consequently the intake air will lose pressure when passing though the turbo-compressor. Under these circumstances, if it is attempted to perform an operation to increase torque that is dependent on the turbo-compressor without utilizing the electric compressor to thereby suppress power consumption, the following problem will arise. That is, the flow rate of air that is supplied to the cylinders of the internal combustion engine will decrease by an amount corresponding to the aforementioned pressure loss accompanying opening of the throttle valve. As a result, a time period required in order to reach the requested engine torque will lengthen.

SUMMARY

Embodiments of the present invention address the above-described problem and provide a control apparatus for an internal combustion engine that is configured so that, in an internal combustion engine in which a turbo-compressor of a turbocharger and an electric compressor are arranged in parallel in an intake passage, when a torque increase request for increasing the engine torque is made, the response of the engine torque can be improved while suppressing power consumption of the electric compressor.

A control apparatus for an internal combustion engine according to preferred embodiments controls an internal combustion engine that includes: a first intake passage through which intake air taken into a cylinder flows; an exhaust passage through which exhaust gas from the cylinder flows; a turbocharger having a turbine that is arranged in the exhaust passage and a turbo-compressor that is arranged in the first intake passage; a second intake passage connected to a portion on a downstream side of the turbo-compressor in the first intake passage; an electric compressor arranged in the second intake passage and configured to be driven by an electric motor; and a throttle valve configured to open and close the first intake passage. The control apparatus includes a controller. The controller is configured to: open the throttle valve after a torque increase request to increase an engine torque is made; predict whether or not a pressure ratio of an outlet pressure with respect to an inlet pressure of the turbo-compressor will become less than 1 after the throttle valve is opened; and perform an air supply operation that supplies air from the second intake passage to the first intake passage using the electric compressor where it is predicted that the pressure ratio will become less than 1, and not to perform the air supply operation where it is predicted that the pressure ratio will not become less than 1.

The controller may be configured, where it is predicted that the pressure ratio will become less than 1, to perform the air supply operation so that the pressure ratio when starting the air supply operation becomes closer to 1 in comparison to the pressure ratio where the air supply operation is not performed.

The flow rate of air that is supplied by the electric compressor during the air supply operation may be obtained by subtracting a second air flow rate from a first air flow rate. In this regard, the first air flow rate is based on a product of an engine speed at a time of the torque increase request and a stroke volume of the cylinder, and the second air flow rate is an air flow rate of the turbo-compressor when the pressure ratio becomes 1 under a speed of the turbo-compressor at the time of the torque increase request.

The flow rate of air that is supplied by the electric compressor during the air supply operation may be greater than or equal to a value obtained by subtracting a second air flow rate from a first air flow rate. In this regard, the first air flow rate is based on a product of an engine speed at a time of the torque increase request and a stroke volume of the cylinder, and the second air flow rate is an air flow rate of the turbo-compressor when the pressure ratio becomes 1 under a speed of the turbo-compressor at the time of the torque increase request.

The flow rate of air that is supplied by the electric compressor during the air supply operation may be less than or equal to a value obtained by subtracting a third air flow rate from a first air flow rate. In this regard, the first air flow rate is based on a product of an engine speed at a time of the torque increase request and a stroke volume of the cylinder, and the third air flow rate is a maximum air flow rate at which a surge occurs in the turbo-compressor under a speed of the turbo-compressor at the time of the torque increase request.

The controller may be configured, where a first air flow rate is greater than a second air flow rate, to predict that the pressure ratio will become less than 1 where the throttle valve is opened. In this regard, the first air flow rate is based on a product of an engine speed at a time of the torque increase request and a stroke volume of the cylinder, and the second air flow rate is an air flow rate of the turbo-compressor when the pressure ratio becomes 1 under a speed of the turbo-compressor at the time of the torque increase request.

The torque increase request may be a request for an engine torque in a supercharging range under circumstances in which an operating range of the internal combustion engine is in a naturally aspirated range. Further, the air supply operation may be performed during a period including at least one part of a period during which a pressure of intake air that is supplied to the cylinder at a time of an increase in engine torque accompanying the torque increase request increases to atmospheric pressure.

According to preferred embodiments of the control apparatus, after a torque increase request for increasing the engine torque is made, the air supply operation is executed where it is predicted that the pressure ratio of the turbo-compressor will become less than 1 after the throttle valve is opened. According to the air supply operation that is executed in this way, when the aforementioned prediction is made in the internal combustion engine having a configuration in which the turbo-compressor is arranged in the first intake passage and the electric compressor is arranged in the second intake passage that is connected to a portion on the downstream side of the turbo-compressor in the first intake passage, an increase in the flow rate of air that passes through the turbo-compressor in response to opening of the throttle valve can be suppressed. Hence, in comparison to where the air supply operation is not executed, a decrease in the pressure ratio of the turbo-compressor to within a range that is less than 1 while the engine torque is increasing can be suppressed. Therefore, an occurrence of a situation in which the turbo-compressor causes a pressure loss of intake air can be suppressed. Further, the air supply operation is not executed where it is predicted that the pressure ratio of the turbo-compressor will not become less than 1 after the throttle valve is opened accompanying the torque increase request. Therefore, in this example, no power is consumed by the electric compressor. Thus, according to preferred embodiments of the control apparatus, where a torque increase request is made, the response of the engine torque can be improved while suppressing power consumption of the electric compressor.

DETAILED DESCRIPTION

First Embodiment

[System Configuration of First Embodiment]

Figure 1:
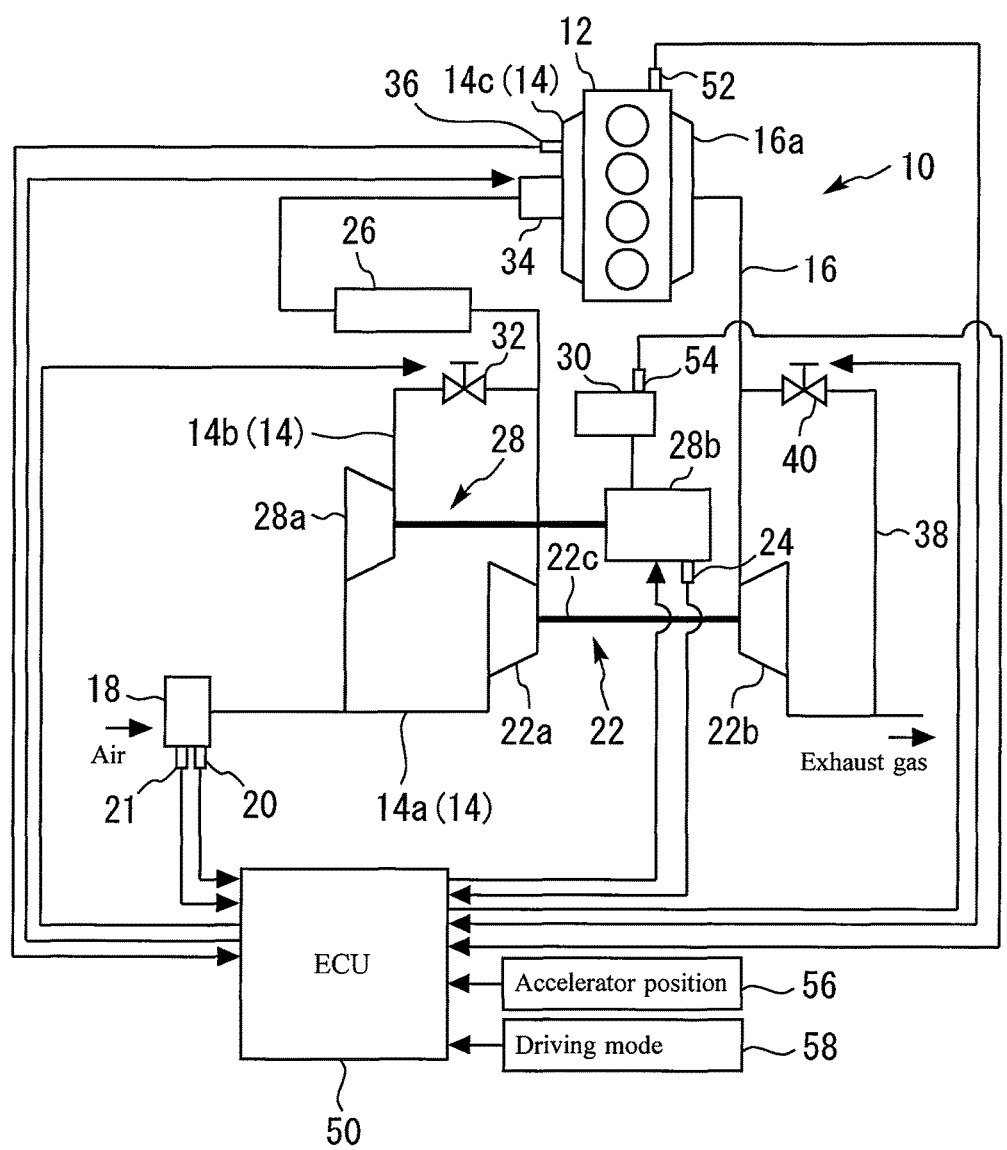
FIG. 1 is a view for schematically describing a system configuration of a first embodiment of the present application.

FIG. 1 is a view for schematically describing a system configuration of a first embodiment of the present application. An internal combustion engine 10 shown in FIG. 1 includes an internal combustion engine main body 12. As one example, the internal combustion engine 10 is a four-stroke, inline four-cylinder spark-ignition engine (for example, a gasoline engine) that is mounted in a vehicle and used as a power apparatus thereof. An intake passage 14 and an exhaust passage 16 communicate with each cylinder of the internal combustion engine main body 12.

The intake passage 14 includes a first intake passage 14a through which air that is taken into the respective cylinders of the internal combustion engine 10 flows. An air cleaner 18 is provided in the vicinity of an inlet of the first intake passage 14a. An air flow sensor 20 that outputs a signal that is in accordance with a flow rate (mass flow rate) of intake air that flows through the first intake passage 14a, and an intake air temperature sensor 21 for detecting the temperature of intake air are attached to the air cleaner 18.

A compressor (hereunder, referred to as "turbo-compressor") 22a of a turbocharger 22 for supercharging intake air is arranged in the first intake passage 14a on the downstream side relative to the air cleaner 18. As one example, a centrifugal compressor can be used as the turbo-compressor 22a. The turbocharger 22 includes a turbine 22b that is arranged in the exhaust passage 16. The turbo-compressor 22a is integrally connected to the turbine 22b through a connecting shaft 22c, and is rotationally driven as a result of exhaust gas flowing through the turbine 22b. Further, a turbo speed sensor 24 for detecting the speed of the turbo-compressor 22a (hereunder, also referred to as "turbo speed") Nt is attached to the turbocharger 22.

An intercooler 26 for cooling intake air that is compressed by the turbo-compressor 22a or by both the turbo-compressor 22a and an electric compressor 28a, described later, is arranged in the first intake passage 14a at a position on the downstream side relative to the turbo-compressor 22a.

The intake passage 14 includes a second intake passage 14b. The second intake passage 14b connects a portion on the upstream side of the turbo-compressor 22a in the first intake passage 14a with a portion on the downstream side thereof in the first intake passage 14a. That is, the second intake passage 14b is an intake passage that bypasses the turbo-compressor 22a. A compressor (hereunder, referred to as "electric compressor") 28a of an electric supercharger 28 is arranged in the second intake passage 14b. As one example, it is assumed that the electric compressor 28a is also a centrifugal compressor. The electric compressor 28a is driven by an electric motor 28b. Electric power from a battery 30 is supplied to the electric motor 28b. Electric power that is stored in the battery 30 is generated by a generator (for example, an alternator) that is not illustrated in the drawings. The electric supercharger 28 can be utilized to supercharge intake air by driving the electric compressor 28a by means of the electric motor 28b.

An on/off valve (for example, an electromagnetic valve) 32 is arranged on the downstream side relative to the electric compressor 28a in the second intake passage 14b. The on/off valve 32 is configured to open the second intake passage 14b on the downstream side relative to the electric compressor 28a when the electric compressor 28a is operated, and to close it when the electric compressor 28a is not operated. Note that, instead of the on/off valve 32, a check valve may be provided that is configured so as to allow a flow of air toward the intercooler 26 side through the second intake passage 14b and restrict a flow of air in the opposite direction thereto.

An electronically controlled throttle valve 34 is arranged in the first intake passage 14a at a position on the downstream side of the intercooler 26. The throttle valve 34 operates in accordance with an accelerator position, and changes the flow rate of intake air according to the accelerator position. A portion of the first intake passage 14a that is on the downstream side relative to the throttle valve 34 is configured as an intake manifold 14c. Intake air is distributed to the respective cylinders through the intake manifold 14c. An intake air pressure sensor 36 is attached to the intake manifold 14c. The intake air pressure sensor 36 detects the pressure of intake air supplied to the respective cylinders (that is, the pressure of intake air immediately upstream of an intake valve (not illustrated in the drawings); as one example, an intake manifold pressure Pim).

Exhaust gas from the respective cylinders is collected by an exhaust manifold 16c in the exhaust passage 16, and discharged to the downstream side. An exhaust bypass passage 38 that bypasses the turbine 22b is connected to the exhaust passage 16. An electronically controlled waste gate valve (WGV) 40 is disposed in the exhaust bypass passage 38 as a bypass valve for opening and closing the exhaust bypass passage 38. By adjusting an opening degree of the WGV 40, the amount of exhaust energy that the turbine 22b recovers can be controlled, and thus the supercharging pressure of the turbo-compressor 22a can be controlled.

As a control apparatus that controls the internal combustion engine 10, the system of the present embodiment also includes an electronic control unit (ECU) 50, and drive circuits (not shown in the drawings) for driving various actuators that are described hereunder. The ECU 50 includes at least an input/output interface, a memory, and a central processing unit (CPU), and performs control of the entire system shown in FIG. 1. The input/output interface is configured to take in sensor signals from various sensors installed in the internal combustion engine 10 or the vehicle in which the internal combustion engine 10 is mounted, and to also output actuating signals to various actuators that the internal combustion engine 10 includes. Various control programs and maps for controlling the internal combustion engine 10 are stored in the memory of the ECU 50. The CPU reads out a control program from the memory and executes the control program, and generates actuating signals for various actuators based on sensor signals that are taken in.

Sensors from which the ECU 50 takes in signals include, in addition to the aforementioned air flow sensor 20, an intake air temperature sensor 21, a turbo speed sensor 24 and an intake air pressure sensor 36, various sensors for acquiring the engine operating state such as a crank angle sensor 52 for acquiring a rotational position of a crankshaft and the engine speed. The aforementioned sensors also include an SOC sensor 54 that detects a state of charge (SOC) of the battery 30, and an accelerator position sensor 56 for detecting a depression amount of an accelerator pedal (accelerator position) of the vehicle in which the internal combustion engine 10 is mounted. Further, the ECU 50 is configured to be capable of taking in a signal relating to a driving mode that is selected by a driver of the vehicle, from a driving mode selector 58. In addition to the aforementioned electric motor 28b, on/off valve 32, throttle valve 34 and WGV 40, actuators to which the ECU 50 outputs actuating signals also include various actuators (not shown in the drawings) for controlling engine operations such as fuel injection valves for supplying fuel to the respective cylinders and an ignition device that includes ignition plugs for igniting an air-fuel mixture in the respective cylinders.

[Engine Torque Control Taken as a Premise]

According to the engine torque control of the internal combustion engine 10, a requested torque is calculated according to the accelerator position, and the engine torque is controlled so as to obtain the requested torque that is calculated. Specifically, when the requested torque is calculated, an intake air flow rate that is necessary in order to realize the requested torque is calculated as a target intake air flow rate.

For the internal combustion engine 10, the intake air flow rate can be adjusted using the throttle valve 34 or the WGV 40. In the present embodiment, for the purpose of improving fuel efficiency by reducing pumping loss, so-called "normally open control" is executed as the control of the WGV 40. Specifically, among engine operating ranges that are defined based on the engine torque and engine speed, in an operating range on a low load side, in a state in which the opening degree of the WGV 40 is opened to a maximum opening degree (hereunder, also referred to as "full opening degree") within a predetermined opening degree control range, the intake air flow rate is adjusted by adjusting the opening degree of the throttle valve 34 so that the target intake air flow rate is obtained. In the present specification, an operating range in which the intake air flow rate is controlled by adjusting the opening degree of the throttle valve 34 in this way is referred to as a "naturally aspirated range".

On the other hand, in an operating range which requires an intake air flow rate larger than the intake air flow rate that is obtained when the throttle valve 34 reaches a full opening degree in a state in which the WGV 40 is opened to the full opening degree, the opening degree of the WGV 40 is adjusted so that, in a state in which the throttle valve 34 is maintained at the full opening degree, a target intake air pressure (target intake manifold pressure) that is required in order to realize the target intake air flow rate is obtained. By this means, the intake air flow rate in this operating range is adjusted so as to become the target intake air flow rate. In the present specification, such an operating range (operating range on a higher load side than the naturally aspirated range) is referred to as a "supercharging range".

As described above, the internal combustion engine 10 of the present embodiment also includes the electric compressor 28a. Therefore, the intake air flow rate can also be adjusted by actuating the electric compressor 28a as needed, including actuation thereof to assist supercharging by the turbo-compressor 22a.

[Control in First Embodiment]
(Problem when Torque Increase Request is Made)

First, a problem that arises when a torque increase request is made will be described referring to FIG. 2 and FIG. 3.

Figure 2:
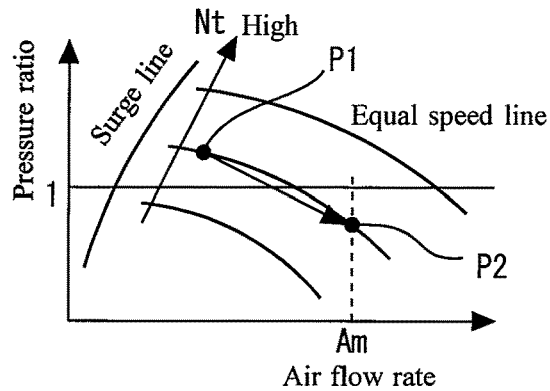
FIG. 2 is a compressor map that illustrates a relation between a pressure ratio of a turbo-compressor and a flow rate of air that passes through the turbo-compressor.

FIG. 2 is a compressor map that illustrates a relation between a pressure ratio of the turbo-compressor 22a and a flow rate of air that passes through the turbo-compressor 22a. FIG. 3 is a time chart that represents changes in the engine torque after a torque increase request is made. Note that, the pressure ratio shown in FIG. 2 is a ratio of an outlet pressure of the turbo-compressor 22a to an inlet pressure thereof (=outlet pressure/inlet pressure).

An operating point P1 in FIG. 2 shows one example of an operating point P of the turbo-compressor 22a at a time point at which a torque increase request (vehicle acceleration request) is detected that requests an engine torque in a supercharging range under circumstances in which the operating range of the internal combustion engine 10 is in the naturally aspirated range. The operating point P1 is an operating point at a time that the WGV 40 is being controlled to a full opening degree (that is, a time when the engine operating range is in a naturally aspirated range), and is an operating point in a state in which a turbo speed Nt is low. Furthermore, the pressure ratio of the turbo-compressor 22a when the turbo speed Nt is in a low state at a time that the WGV 40 is being controlled to a full opening degree is determined in accordance with whether or not the turbo-compressor 22a is performing work (supercharging work) for increasing the pressure of intake air, and the size of the power (work rate) of supercharging of the turbo-compressor 22a. That is, when the turbo-compressor 22a is performing a small amount of supercharging work, the pressure ratio at the operating point P1 shows a value that is slightly higher than 1 as shown in FIG. 2, and approaches 1 as the turbo speed Nt becomes lower, because the supercharging work rate decreases.

Where the aforementioned torque increase request (that is, a request to transition to the supercharging range from a state in which the turbo speed Nt is low, as in the state indicated by the operating point P1, during use in the naturally aspirated range) is made, according to the system of the present embodiment that utilizes normally open control of the WGV 40, the throttle valve 34 is controlled to open fully and the WGV 40 is closed. When it is attempted to provide for an increase in the intake air flow rate by means of the turbo-compressor 22a without utilizing the electric compressor 28a at the time of such a torque increase request, although power consumption that would be caused by utilizing the electric compressor 28a can be suppressed, there is the following problem. That is, where the WGV 40 is closed while keeping the throttle valve 34 fully open, the response with respect to the intake air flow rate that is obtained by adjusting the throttle valve 34 becomes higher than the response obtained by adjusting the WGV 40. As a result, the intake air flow rate changes in the following manner where a torque increase request is made. That is, first, accompanying opening of the throttle valve 34 to the full opening degree, the intake air flow rate increases to become a volume flow rate Av that is based on a product of the displacement of the internal combustion engine 10 and the engine speed at the time of the torque increase request, and thereafter the intake air flow rate increases by means of supercharging of the turbo-compressor 22a as a result of the turbo speed Nt beginning to increase.

An air flow rate corresponding to the above described volume flow rate Av is utilized for the engine control of the present embodiment after being converted to a mass flow rate Am. The above described volume flow rate Av corresponds to an air flow rate that is required in a naturally aspirated range in an initial stage (initial stage of acceleration) during a torque increase period when the engine torque is increased upon receiving a torque increase request. In other words, the volume flow rate Av corresponds to a flow rate of air that is supplied to (all cylinders of) the internal combustion engine 10 when the throttle valve 34 is fully opened under the engine speed at the time of detection of a torque increase request. Therefore, in the following explanation, a mass flow rate Am to which the volume flow rate Av is converted is referred to as "engine required air flow rate Am", and this may also be abbreviated to "required air flow rate Am". Note that, based on the above described definition of the volume flow rate Av, it will be understood that the required air flow rate Am increases as the engine speed increases.

Note that, in the present embodiment, the reason for utilizing the mass flow rate Am and not using the volume flow rate Av as it is, is that the mass flow rate of intake air that is detected using the air flow sensor 20 is utilized for engine control. Accordingly, in a system that utilizes an air flow sensor that detects a volume flow rate, unlike the present embodiment, a configuration may be adopted that uses the volume flow rate Av as an "engine required air flow rate Av".

An increase in the intake air flow rate to the required air flow rate Am accompanying the throttle valve 34 being fully opened is a sudden increase for the turbo-compressor 22a, and consequently the required air flow rate Am may exceed an air flow rate at which supercharging can be performed under the turbo speed Nt at the time of the torque increase request. If so, the turbo-compressor 22a functions as a restrictor in the first intake passage 14a.

More specifically, in a situation in which an increase in the intake air flow rate accompanying opening of the throttle valve 34 is a sudden increase for the turbo-compressor 22a, the flow rate of air that passes through the turbo-compressor 22a increases while the turbo speed Nt does not increase and remains as it is. On the compressor map shown in FIG. 2, this corresponds to the operating point P of the turbo-compressor 22a moving to a high intake air flow rate side on an equal speed line from the operating point P1. At such a time, if the operating point P when the air flow rate becomes the required air flow rate Am on the equal speed line that passes through the operating point P1 is an operating point at which the pressure ratio is less than 1, such as for an operating point P2 in FIG. 2, the turbo-compressor 22a functions as a restrictor. As a result, the presence of the turbo-compressor 22a causes a pressure loss of the intake air.

Figure 3:
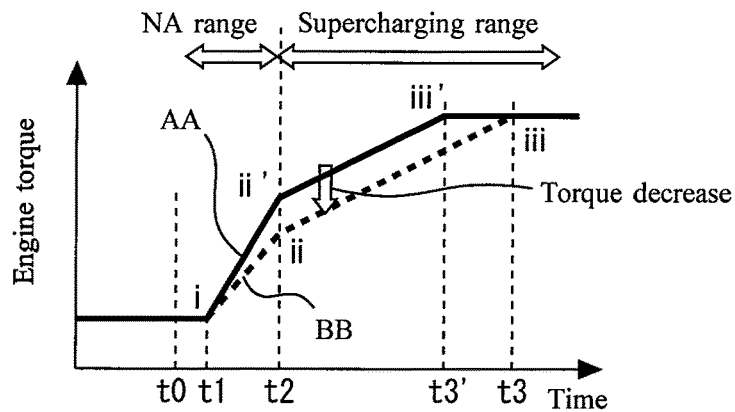
FIG. 3 is a time chart that represents changes in engine torque after a torque increase request is made.

A dashed line in FIG. 3 represents changes in the engine torque where the turbo-compressor 22a functions as a restrictor when the engine torque is increased in response to a torque increase request. On the other hand, a solid line in FIG. 3 represents changes in the engine torque where the turbo-compressor 22a does not function as a restrictor when the engine torque is increased under the same conditions as indicated by the dashed line. In FIG. 3, a time point t0 is a time point at which a torque increase request that is made by depression of the accelerator pedal is detected. Further, a time point t1 is a time point at which the engine torque (intake air flow rate) begins to increase upon actuation of the throttle valve 34 (and WGV 40) accompanying a torque increase request. Furthermore, a time point t2 is a time point at which an intake air flow rate corresponding to the required air flow rate Am enters the cylinders accompanying the throttle valve 34 being fully opened.

After the time point t2 is passed, since the turbo speed Nt increases as an action that results from closing of the WGV 40, the intake air flow rate (engine torque) increases. Accordingly, as shown in FIG. 3, the engine operating range used up to the time point t2 corresponds to the naturally aspirated range (NA range), and the engine operating range used after the time point t2 is passed corresponds to the supercharging range. Further, time points t3 and t3' are time points at which the engine torque reaches the requested torque (time points at which the intake air flow rate reaches the target intake air flow rate at the time of the current torque increase request), respectively. Note that, as will also be understood from this description, the required air flow rate Am is different than the target intake air flow rate (intake air flow rate that is a final target to be reached in accordance with an accelerator depression amount (torque increase request degree)).

When a pressure loss of the intake air increases as a result of the turbo-compressor 22a functioning as a restrictor as described above, the flow rate of air that flows into the cylinders accompanying the throttle valve 34 being fully opened (corresponds to required air flow rate Am) decreases by an amount corresponding to the aforementioned pressure loss in comparison to a value where the turbo-compressor 22a does not become a restrictor. As a result, as will also be understood based on FIG. 3, where the turbo-compressor 22a functions as a restrictor (dashed line), the engine torque that is realized by fully opening the throttle valve 34 (engine torque at time point t2) decreases in comparison to where the turbo-compressor 22a does not function as a restrictor (solid line). The influence of this torque decrease is also received in a time period (a period after the time point t2) in which the engine torque increases depending on the turbo-compressor 22a (that is, after entering the supercharging range also). Consequently, where the turbo-compressor 22a functions as a restrictor, a time period that is required until reaching the final requested torque is lengthened by a period corresponding to the difference between the time point t3 and the time point t3', and this leads to a decrease in the acceleration performance of the vehicle.

(Outline of Control in First Embodiment)

Figure 4:
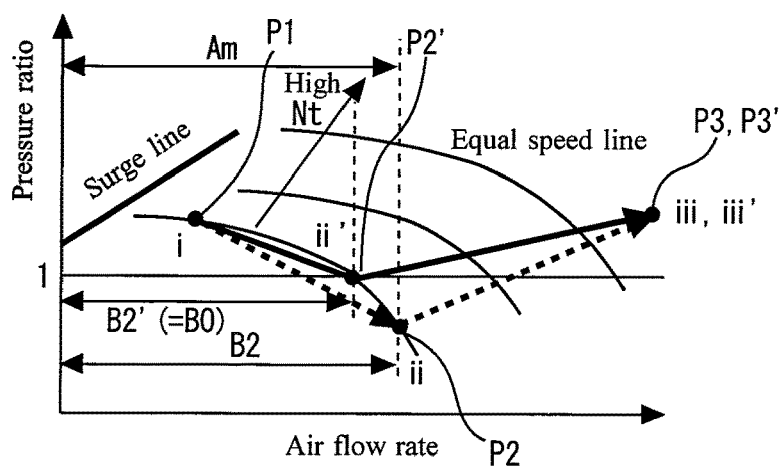
FIG. 4 is a compressor map of a turbo-compressor for explaining control that is executed at a time of a torque increase request in the first embodiment of the present application.

Next, control that is executed at the time of a torque increase request in the first embodiment of the present application will be described referring to FIG. 4. A compressor map illustrated in FIG. 4 is a map of the turbo-compressor 22a. Note that, timings at which the operating point P reaches respective operating points P1, P2, P2', P3 and P3' that are associated with symbols "i", "ii", "ii'", "iii" and "iii'", respectively, in FIG. 4 correspond to time points t1, t2, t3 and t3' that are associated with the aforementioned symbol "i" and the like in the time chart in FIG. 3. Further, a surge line in FIG. 4 indicates that a surge occurs in the turbo-compressor 22a when the operating point P of the turbo-compressor 22a is within a surge region on the side of a high pressure ratio and low air flow rate relative to this surge line.

In the present embodiment, the following control is executed after a request to increase torque from a naturally aspirated range to a supercharging range is made. That is, it is determined whether or not the pressure ratio of the turbo-compressor 22a will become less than 1 after the throttle valve 34 is opened accompanying the torque increase request. Where it is predicted that the pressure ratio of the turbo-compressor 22a will become less than 1 after the throttle valve 34 is opened, an air supply operation is performed to supply air to the first intake passage 14a from the second intake passage 14b using the electric compressor 28a. In contrast, where it is predicted that the pressure ratio of the turbo-compressor 22a will not become less than 1 after the throttle valve 34 is opened, an air supply operation is not performed.

Specifically, a determination regarding whether or not the pressure ratio of the turbo-compressor 22a will become less than 1 after the throttle valve 34 is opened accompanying a torque increase request can be performed, for example, as follows. That is, an air flow rate B0 at an operating point P2' shown in FIG. 4 is an air flow rate when a pressure ratio becomes 1 on an equal speed line that passes through the operating point P1 at the time of a torque increase request. Where the required air flow rate Am is greater than the air flow rate B0, the pressure ratio of the turbo-compressor 22a becomes less than 1 (that is, the turbo-compressor 22a functions as a restrictor) as a result of the air flow rate increasing to the required air flow rate Am while the turbo speed Nt remains substantially as it is and does not increase accompanying opening of the throttle valve 34. In contrast, where the required air flow rate Am becomes equal to or less than the air flow rate B0, even when the throttle valve 34 is opened and the air flow rate rapidly increases as far as the required air flow rate Am, the pressure ratio does not become less than 1 (that is, the turbo-compressor 22a does not function as a restrictor). Accordingly, the above described determination can be performed based on whether or not the required air flow rate Am is greater than the air flow rate B0.

In the present embodiment, the above described air supply operation is executed in a form in which the pressure ratio of the turbo-compressor 22a when the air supply operation starts (more specifically, in the course of the engine torque increasing accompanying a torque increase request) is brought close to 1 in comparison to a pressure ratio where the air supply operation is not performed. More specifically, an air supply operation according to the present embodiment is executed with an assist air flow rate C for causing the pressure ratio of the turbo-compressor 22a to be a value of 1 when the air flow rate reaches the required air flow rate Am while the torque is increasing. The assist air flow rate C is the flow rate of air that passes through the electric compressor 28a (that is, an air flow rate that the electric compressor 28a supplies downstream of the turbo-compressor 22a) during execution of the air supply operation, and is set as a flow rate that is obtained by subtracting the air flow rate B0 from the required air flow rate Am.

The trajectory of the operating point P shown by a dashed line in FIG. 4 represents an example in which an air supply operation is not performed by the electric compressor 28a, and corresponds to the dashed line in FIG. 3. According to the trajectory shown by this dashed line, when the throttle valve 34 is fully opened upon receiving a torque increase request, the pressure ratio becomes less than 1 in the course of the operating point P on the equal speed line reaching P2 (operating point corresponding to the required air flow rate Am) from P1.

In contrast, the trajectory of the operating point P shown by a solid line in FIG. 4 represents an example in which an air supply operation is performed and, for the reasons described hereunder, corresponds to the solid line in FIG. 3. When both of the turbo-compressor 22a and the electric compressor 28a are operating, the sum of an air flow rate B that passes through the turbo-compressor 22a and the assist air flow rate C that passes through the electric compressor 28a is an engine air flow rate A that is supplied to all cylinders that are connected to the first intake passage 14a (all cylinders of the internal combustion engine 10). Therefore, under circumstances in which the engine air flow rate A becomes the required air flow rate Am as a result of the throttle valve 34 being fully opened upon receipt of a torque increase request, when air of an amount corresponding to the assist air flow rate C (=A−B0) is supplied downstream of the turbo-compressor 22a by the electric compressor 28a, an air flow rate B2' that passes through the turbo-compressor 22a is as follows.

That is, as shown by a trajectory indicated by a solid line in FIG. 4, the air flow rate B2' is a flow rate that is obtained by subtracting the assist air flow rate C from the required air flow rate Am, that is, the air flow rate B0. Thus, by supplying air at the assist air flow rate C by means of the electric compressor 28a, the air flow rate B2' at the operating point P2' of the turbo-compressor 22a when the engine air flow rate A reaches the required air flow rate Am decreases by an amount corresponding to the assist air flow rate C, in comparison to the air flow rate B2 when air is not supplied by the electric compressor 28a. That is, an increase in the flow rate of air B passing through the turbo-compressor 22a accompanying opening of the throttle valve 34 can be suppressed. By this means, the pressure ratio at the operating point P2' can be made a value of 1 (occurrence of a situation in which the pressure ratio falls to less than 1 can be avoided).

According to the above described air supply operation, the occurrence of a pressure loss of the intake air at the turbo-compressor 22a can be avoided. By this means, after a request to increase the torque from the naturally aspirated range to the supercharging range is made, the amount of increase in the intake air flow rate (amount of increase in the engine torque) in the naturally aspirated range can be raised in comparison to where the air supply operation is not performed. Further, in accompaniment therewith, it is possible to shorten the time period until reaching the engine torque that is the final target to be reached at the time of a torque increase request. That is, the change over time in the engine torque where the engine torque is increased from the naturally aspirated range to the supercharging range can be represented by the solid line in FIG. 3.

(Specific Processing in First Embodiment)

Figure 5:
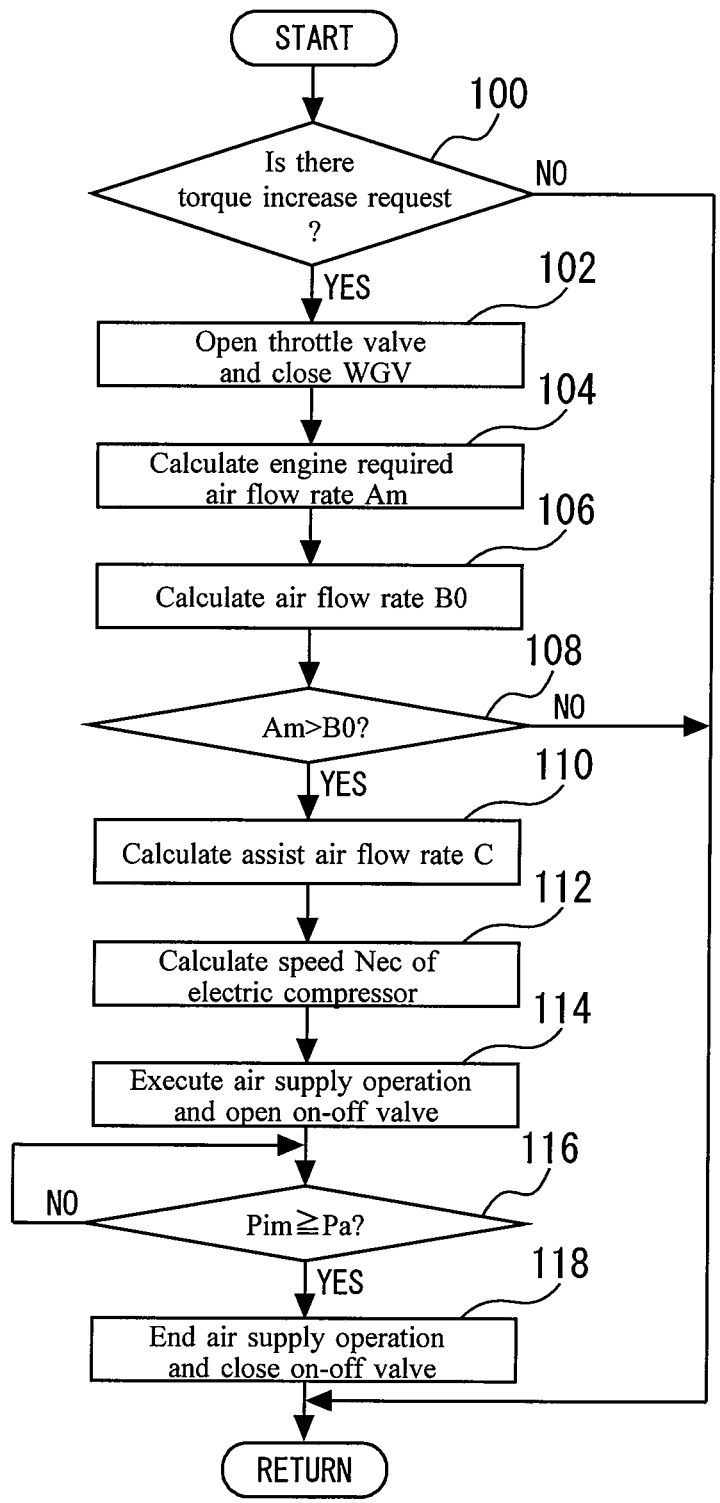
FIG. 5 is a flowchart illustrating the flow of control that is executed at a time of a torque increase request in the first embodiment of the present application.

FIG. 5 is a flowchart illustrating the flow of control that is executed after a torque increase request is made in the first embodiment of the present application. As shown in FIG. 5, first, the ECU 50 determines whether or not there is a torque increase request to increase the torque from the naturally aspirated range to the supercharging range (step 100). The existence/non-existence of the torque increase request (acceleration request for the vehicle), can be determined, for example, based on whether or not the accelerator pedal is depressed such that the accelerator depression amount becomes equal to or greater than a predetermined value from a state in which the accelerator depression amount is less than the predetermined value. That is, the predetermined value is previously set as a threshold value of an accelerator depression amount that enables a determination as to whether or not a torque increase request (acceleration request) is a request for a torque increase from the naturally aspirated range to the supercharging range.

Where the determination in step 100 is affirmative, the ECU 50 executes processing for opening the throttle valve 34 and closing the WGV 40 (step 102). Specifically, the opening degree of the throttle valve 34 is controlled to the full opening degree. The opening degree of the WGV 40 is controlled to an opening degree corresponding to the requested torque that is based on the accelerator depression amount. Note that, in order to rapidly increase the supercharging pressure, the opening degree of the WGV 40 at this time may be controlled to a fully closed opening degree in the initial stage, and thereafter may be controlled to an opening degree corresponding to the requested torque.

Next, the ECU 50 calculates the required air flow rate Am (step 104). The required air flow rate (mass flow rate) Am can be calculated by multiplying an intake air density pim by the volume flow rate Av. The volume flow rate Av is an air flow rate based on the product of a total stroke volume that is a sum of the stroke volumes of all cylinders connected to the first intake passage 14a (in the internal combustion engine 10, corresponds to a displacement Ve of the internal combustion engine 10) and an engine speed Ne.

More specifically, the volume flow rate Av can be calculated by dividing by two the product of the displacement Ve ($m^3$), the engine speed Ne ($s^{-1}$) at the time of the torque increase request, and a volumetric efficiency ηv of the intake air. The volumetric efficiency ηv of the intake air can be calculated by referring to a map in which the relation between the engine speed Ne and the volumetric efficiency ηv is defined (not shown in the drawings). Further, the intake air density pim can be calculated by substituting the intake manifold pressure Pim and the intake air temperature inside the intake manifold 14c into the equation of state of gas. Note that, the intake air temperature that is used to calculate the intake air density pim may also be substituted with an intake air temperature (inside the air cleaner 18) at the intake passage inlet. In step 104, the intake manifold pressure Pim that is detected by the intake air pressure sensor 36 and the intake air temperature at the intake air inlet that is detected by the intake air temperature sensor 21 are used to calculate the intake air density pim.

Note that, in a stricter sense, for example, when a configuration is adopted such that the intake air valve timing is changed according to an engine load factor KL, the volumetric efficiency ηv changes according to the engine load factor KL. Consequently, a configuration may also be adopted in which the volumetric efficiency ηv is calculated based on the relation with the engine load factor KL in addition to the engine speed Ne.

Figure 6:
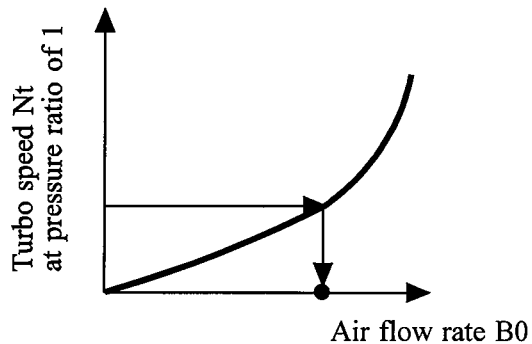
FIG. 6 is a view that represents an example of a map that defines the relation between a turbo speed Nt, when a pressure ratio of a turbo-compressor is 1, and an air flow rate B0.

Next, the ECU 50 calculates the air flow rate B0 (step 106). The ECU 50 stores a map that defines the relation between the turbo speed Nt when the pressure ratio of the turbo-compressor 22a is 1, and the air flow rate B0. FIG. 6 is a view that represents an example of such a map. As shown in FIG. 6, the air flow rate B0 increases as the turbo speed Nt rises. In the present step 106, the air flow rate B0 corresponding to the turbo speed Nt that is detected by the turbo speed sensor 24 is calculated referring to such a map. Note that, acquisition of the turbo speed Nt is not limited to detection by the turbo speed sensor 24, and may be estimated using a known technique.

Next, the ECU 50 determines whether or not the required air flow rate Am is greater than the air flow rate B0 (step 108). As a result, where the ECU 50 determines that the required air flow rate Am is greater than the air flow rate B0, that is, where it can be predicted that the pressure ratio of the turbo-compressor 22a will become less than 1 when the throttle valve 34 is opened accompanying a torque increase request, the ECU 50 proceeds to step 110. On the other hand, where the ECU 50 determines that the required air flow rate Am is less than or equal to the air flow rate B0, that is, where it can be predicted that the pressure ratio of the turbo-compressor 22a will not become less than 1 even when the throttle valve 34 is opened accompanying a torque increase request, the ECU ends the processing with respect to the current torque increase request.

In step 110, the assist air flow rate C that the electric compressor 28a supplies in an air supply operation of the present embodiment is calculated. As described above, the assist air flow rate C is calculated as a value that is obtained by subtracting the air flow rate B0 from the required air flow rate Am.

Figure 7:
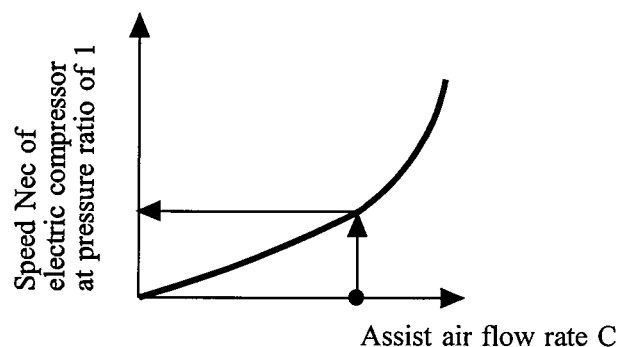
FIG. 7 is a view that represents an example of a map that defines the relation between a speed Nec of an electric compressor, when a pressure ratio of an electric compressor is 1, and an assist air flow rate C.

Next, based on the assist air flow rate C calculated in step 110, the ECU 50 calculates the speed Nec of the electric compressor 28a during execution of the current air supply operation (step 112). The ECU 50 stores a map that defines the relation between the speed Nec of the electric compressor 28a when the pressure ratio of the electric compressor 28a is 1, and the assist air flow rate C. FIG. 7 is a view that represents an example of such a map. As shown in FIG. 7, the greater that the assist air flow rate C is, the higher the compressor speed Nec becomes. In the present step 112, the compressor speed Nec corresponding to the assist air flow rate C that is calculated as described above is calculated referring to such a map. By calculating the compressor speed Nec corresponding to the assist air flow rate C (=Am−B0) utilizing the relation illustrated in FIG. 7, and actuating the electric compressor 28a using the compressor speed Nec under circumstances in which the required air flow rate Am at the time of a torque increase request is greater than the air flow rate B0, air can be supplied in a state in which the electric compressor 28a is actuated under a pressure ratio of 1.

Next, in step 114, the ECU 50 executes processing for opening the on/off valve 32 provided downstream of the electric compressor 28a, and processing for actuating the electric compressor 28a at the compressor speed Nec calculated in step 112 (that is, executing an air supply operation) (step 114).

Next, the ECU 50 determines whether or not the pressure of intake air supplied to the respective cylinders (here, the intake manifold pressure Pim is used) has reached an atmospheric pressure Pa (step 116). As a result, during a period in which the result of the present determination is negative, that is, during a period in which the operating range while the engine torque is increasing is in the naturally aspirated range, the ECU 50 continues the air supply operation. On the other hand, if the result of the present determination is affirmative, the ECU 50 executes processing for closing the on/off valve 32 and also processing to end the air supply operation (step 118).

According to the above described assist by the electric compressor 28a in the present embodiment, based on the fundamental concept of utilizing the turbo-compressor 22a to satisfy the requested torque, supercharging using the electric compressor 28a is not actively performed, and, instead, an air supply operation is performed (that is, the power of the battery 30 is used) only where it is predicted that a pressure loss of intake air will arise at the turbo-compressor 22a. Further, the assist air flow rate C of the electric compressor 28a during execution of an air supply operation is obtained by supplying air of a small amount (Am−B0) that is just enough to avoid an occurrence of a pressure loss of the intake air at the turbo-compressor 22a. By this means, at the time of a request to increase the torque from the naturally aspirated range to the supercharging range, the response of the engine torque (acceleration response) is improved while suppressing power consumption to the necessary minimum.

Note that, in the above described first embodiment, the ECU 50 that is configured to: execute the processing in step 102 where the determination in step 100 is affirmative; execute the series of processing in steps 104 to 108 where the determination in step 100 is affirmative; and execute the series of processing in steps 110 to 118 where the determination in step 108 is affirmative, corresponds to a "controller" according to the present application. Further, the engine required air flow rate Am corresponds to "first air flow rate" according to the present application, and the air flow rate B0 corresponds to "second air flow rate" according to the present application.

Second Embodiment

Next, a second embodiment of the present application will be described by referring to FIG. 8 to FIG. 10. In the following description, as one example of a system configuration of the second embodiment, a system configuration described above referring to FIG. 1 is used.

[Control of Second Embodiment]
(Outline of Control of Second Embodiment)

Figure 8:
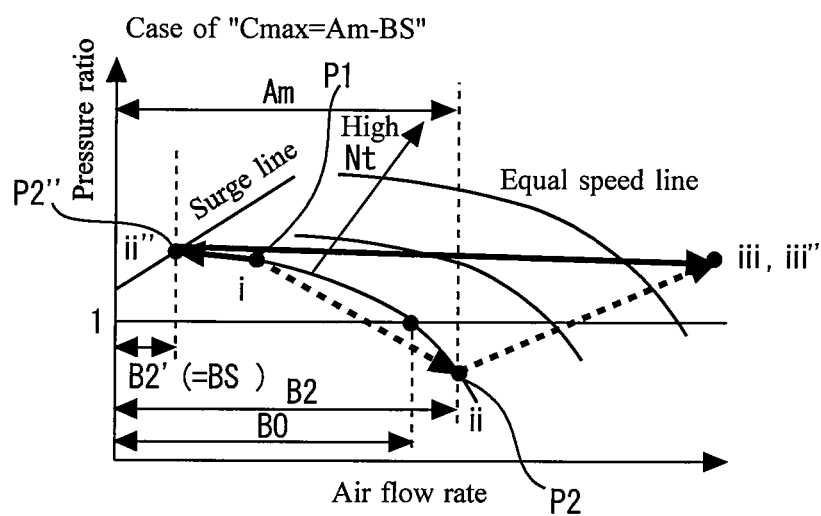
FIG. 8 is a view for describing an air supply operation in a second embodiment of the present application, and illustrates a compressor map of a turbo-compressor.

FIG. 8 is a view for describing an air supply operation in the second embodiment of the present application, and illustrates a compressor map of a turbo-compressor 22a.

According to the air supply operation in the above described first embodiment, by causing the flow rate of air supplied by the electric compressor 28a to be an assist air flow rate C (=Am−B0), the electric compressor 28a can be caused to perform the required minimum assist to ensure that the turbo-compressor 22a does not function as a restrictor at the time of a request to increase torque from the naturally aspirated range to the supercharging range.

If a configuration is adopted so as to increase the flow rate C of air that is supplied by means of the electric compressor 28a to a flow rate that is greater than the air flow rate (Am−B0) during a period in which the operating point of the internal combustion engine 10 passes through the naturally aspirated range (period corresponding to a period from the time point t1 to time point t2 in FIG. 3) while the torque is increasing, although the power consumption will increase, the engine torque at the timing at which the aforementioned time point t2 is reached can be improved. Further, in accompaniment therewith, a time period until reaching the engine torque that is the final target to be reached at the time of a torque increase request can be shortened. Accordingly, the response of the engine torque (acceleration response) can be raised.

However, it is necessary to pay attention to the following point when increasing the assist air flow rate C to a flow rate that is greater than the air flow rate (Am−B0). That is, an operating point P2" shown in FIG. 8 is a point of intersection between an equal speed line that passes through the operating point P1 at the time of a torque increase request and a surge line. A surge limit air flow rate BS is an air flow rate at the operating point P2", and is the maximum air flow rate (i.e. the limit of the air flow rate) at which a surge occurs in the turbo-compressor 22a under the equal speed line that passes through the operating point P1. When the assist air flow rate C is made greater than a flow rate (Am−BS) obtained by subtracting the surge limit air flow rate BS from the required air flow rate Am, the flow rate of air that passes through the turbo-compressor 22a will become less than the surge limit air flow rate BS as a result of actuating the electric compressor 28a. Consequently, a surge will occur in the turbo-compressor 22a and it will no longer be possible to achieve an improvement in the engine torque. Therefore, on the contrary, the response of the engine torque will decrease. Accordingly, from the viewpoint of avoiding a surge at the turbo-compressor 22a, it is necessary to make the assist air flow rate C, at maximum, the surge limit air flow rate BS.

The reason that the response of the engine torque (acceleration response) can be raised as described above by adopting a configuration that increases the assist air flow rate C to a flow rate that is greater than the air flow rate (Am−B0) will now be described. Here, the reason will be described taking as an example the trajectory of the operating point P that is indicated by a solid line in FIG. 8, that is, an example in which an air supply operation is performed utilizing a maximum assist air flow rate Cmax. Note that, the trajectory of the operating point P that is indicated by a dashed line in FIG. 8 is the same as that indicated by a dashed line in FIG. 4.

Where an air supply operation is performed utilizing the maximum assist air flow rate Cmax, the air flow rate itself that is supplied to the internal combustion engine 10 at a timing (time point t2 in FIG. 3) at which the operating point of the internal combustion engine 10 finishes passing through the naturally aspirated range corresponds to, in terms of a volume flow rate, the volume flow rate Av, similar to where a minimum assist air flow rate Cmin (=A−B0) is utilized. However, as will be understood by comparing the pressure ratio at the operating point P2' in FIG. 4 and the pressure ratio at the operating point P2" in FIG. 8, the pressure ratio of the turbo-compressor 22a (=pressure ratio of the electric compressor 28a) becomes higher in the case of utilizing the maximum assist air flow rate Cmax in comparison to the case of utilizing the minimum assist air flow rate Cmin. Because the inlet pressure of the turbo-compressor 22a corresponds to atmospheric pressure and there is no change, the fact that the pressure ratio becomes higher means that the outlet pressure of the turbo-compressor 22a becomes higher, and the intake manifold pressure Pim becomes higher in accompaniment therewith. When the intake manifold pressure Pim becomes higher, the intake air density pim becomes higher. As a result, in terms of the mass flow rate, the air flow rate that is supplied to the internal combustion engine 10 at the time point t2 in FIG. 3 increases where the maximum assist air flow rate Cmax is utilized. This is a factor that increases the engine torque. Therefore, if a configuration is adopted so as to increase the assist air flow rate C supplied by an air supply operation to a flow rate that is greater than the minimum assist air flow rate Cmin (=Am−B0), as described above, the engine torque can be raised during a period in which the operating point of the internal combustion engine 10 passes through a naturally aspirated range (period from the time point t1 to the time point t2 in FIG. 3) while the torque is increasing, and in accompaniment therewith the response of the engine torque (acceleration response) can be raised.

Therefore, in the present second embodiment, a configuration is adopted that changes the assist air flow rate C within a range from the minimum assist air flow rate Cmin (=Am−B0) to the maximum assist air flow rate Cmax (=Am−BS) in accordance with a driving mode that a driver of a vehicle selects and the SOC (state of charge) of the battery 30 that supplies power to the electric compressor 28a. Here, an economy mode and a sports mode are assumed as examples of the driving mode. The economy mode is a driving mode that prioritizes improving the fuel efficiency of the internal combustion engine 10 by suppressing power consumption by the electric compressor 28a rather than improving the acceleration response of the vehicle. In contrast, the sports mode is a mode that prioritizes acceleration response rather than improving the fuel efficiency. Further, the SOC is an index value that represents the state of charge of the battery 30 in a manner that represents a state in which the battery 30 is fully charged as 100%, and a state in which the battery 30 is fully discharged as 0%.

(Specific Processing in Second Embodiment)

Figure 9:
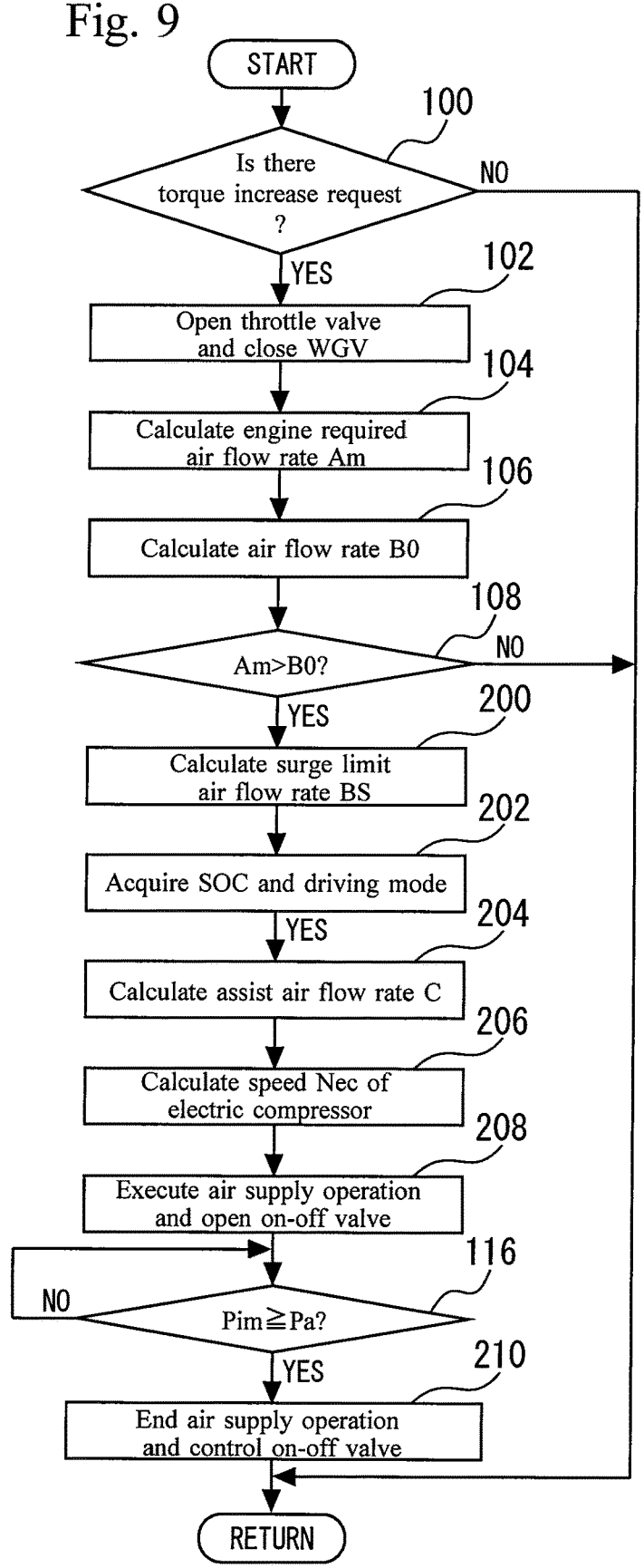
FIG. 9 is a flowchart illustrating the flow of control that is executed at a time of a torque increase request in the second embodiment of the present application.

FIG. 9 is a flowchart illustrating the flow of control that is executed after a torque increase request is made in the second embodiment of the present application. In FIG. 9, steps that are the same as steps illustrated in FIG. 5 in the first embodiment are denoted by the same reference numerals as in FIG. 5, and a description thereof with respect to FIG. 9 is omitted or abbreviated.

According to the processing in accordance with the flowchart illustrated in FIG. 9, when an ECU 50 determines in step 108 that a required air flow rate Am is greater than an air flow rate B0, the operation proceeds to step 200. The ECU 50 stores a compressor map (see FIG. 8) of a turbo-compressor 22a. In the present step 200, the ECU 50 refers to the compressor map and calculates a surge limit air flow rate BS at an operating point at which an equal speed line of a turbo speed Nt at a time of a torque increase request and a surge line intersect (as one example, the operating point P2" in FIG. 8).

Next, in this embodiment, the ECU 50 acquires an SOC using an SOC sensor 54, and acquires a current driving mode using a driving mode selector 58 (step 202). Next, the ECU 50 calculates an assist air flow rate C as a value in accordance with the driving mode and the SOC that are acquired in step 202 within a range from a minimum assist air flow rate Cmin (=Am−B0) to a maximum assist air flow rate Cmax (=Am−BS) (step 204).

As one example, determination of the assist air flow rate C in accordance with the driving mode and the SOC can be performed by the following technique. That is, where an economy mode is selected, the ECU 50 uses the minimum assist air flow rate Cmin (=Am−B0) as the assist air flow rate C, regardless of the size of the SOC. On the other hand, where a sports mode is selected, the ECU 50 changes the assist air flow rate C in accordance with the size of the SOC within the range from the minimum assist air flow rate Cmin (=Am−B0) to the maximum assist air flow rate Cmax (=Am−BS). In this example, the higher that the SOC is, the higher the value within the aforementioned range that the assist air flow rate C is increased to. By this means, the assist air flow rate C can be varied in accordance with a degree of acceleration response that is requested by a driver, while taking the SOC into consideration.

Next, the ECU 50 calculates a speed Nec of an electric compressor 28a based on the assist air flow rate C calculated in step 204 and a pressure ratio R calculated as follows (step 206). Where the electric compressor 28a is operated at the assist air flow rate C during a period in which an operating point of an internal combustion engine 10 passes through a naturally aspirated range (period from time point t1 to time point t2 in FIG. 3) while the torque is increasing, an air flow rate B that passes through the turbo-compressor 22a becomes a flow rate B2" (=Am−C) that is obtained by subtracting the assist air flow rate C from the required air flow rate Am. A pressure ratio R can be calculated by referring to the compressor map of the turbo-compressor 22a, as the pressure ratio at a time that the air flow rate B2" is obtained under the turbo speed Nt when the torque increase request is made.

Figure 10:
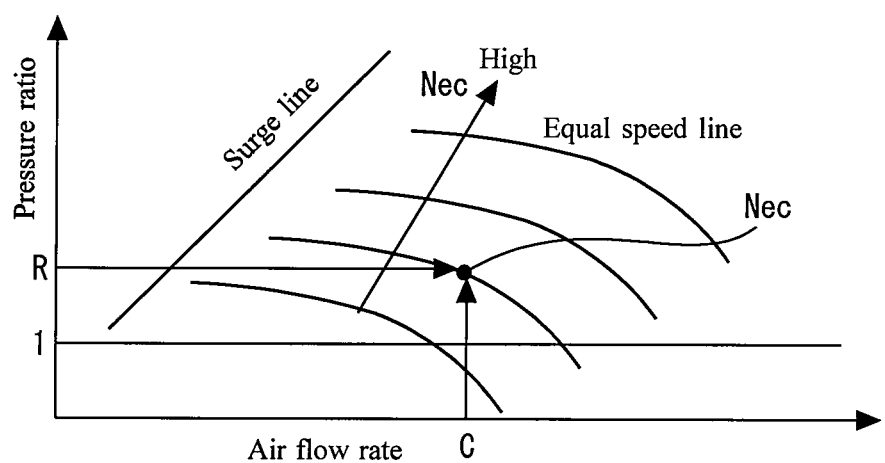
FIG. 10 is a view that represents a compressor map of an electric compressor.

FIG. 10 is a view that represents the compressor map of an electric compressor 28a. In a state in which an on/off valve 32 is opened in an internal combustion engine 10 in which the turbo-compressor 22a and the electric compressor 28a are arranged in parallel, a pressure ratio of the turbo-compressor 22a and a pressure ratio of the electric compressor 28a become equal. In the present step 206, a speed Nec of the electric compressor 28a at which the assist air flow rate C is obtained under the pressure ratio R calculated as described above is calculated by referring to the compressor map of the electric compressor 28a. Next, the ECU 50 proceeds to step 208.

In step 208, processing for performing an air supply operation using the compressor speed Nec calculated in step 206 is executed, and processing for opening the on/off valve 32 is also executed. Further, when the determination made in step 116 thereafter is affirmative, the ECU 50 proceeds to step 210.

In step 210, processing for ending the air supply operation is executed, and processing relating to control of the on/off valve 32 is executed. Specifically, for example, where supercharging assist by the electric compressor 28a is not to be performed after an operating range enters a supercharging range while the torque is increasing (for example, where the economy mode is selected), control that closes the on/off valve 32 corresponds to the aforementioned control of the on/off valve 32. Further, for example, where the sports mode is selected or where supercharging assist by the electric compressor 28a is separately performed after the operating range enters the supercharging range for the reason that a surplus exists with respect to the SOC, control that maintains the on/off valve 32 in an open state corresponds to the control of the on/off valve 32 in the present step 210. Where a configuration is adopted that closes the on/off valve 32 accompanying the end of an air supply operation irrespective of an assist being performed after entering the supercharging range in this manner, the start of the aforementioned assist is delayed by a time period that is required to open the on/off valve 32 again after the on/off valve 32 is temporarily closed, and furthermore additional power is consumed to open and close the on/off valve 32. Accordingly, in this example, it is preferable to maintain the on/off valve 32 in an open state.

According to the above described processing in accordance with the flowchart shown in FIG. 9, the assist air flow rate C of the electric compressor 28a can be appropriately set in accordance with the SOC and the driving mode (degree of acceleration response requested by the driver) while avoiding the occurrence of a situation in the turbo-compressor 22a functions as a restrictor when the throttle valve 34 is opened accompanying a torque increase request. In particular, where the minimum assist air flow rate Cmin (=Am−B0) is selected as the assist air flow rate C, a situation in which a pressure loss of intake air occurs in the turbo-compressor 22a can be avoided while suppressing power consumption to a minimum. Further, according to the above described settings, since the assist air flow rate C is set to a flow rate within a range that does not exceed the maximum assist air flow rate Cmax (=Am−BS), a situation in which a surge arises in the turbo-compressor 22a due to the assist air flow rate C being increased too much (in other words, due to the air flow rate B for which the turbo-compressor 22a is responsible being decreased too much) can be avoided.

Note that, in the above described second embodiment, the ECU 50 that is configured to: execute the processing in step 102 where the determination in step 100 is affirmative; execute the series of processing in steps 104 to 108 where the determination in step 100 is affirmative; and execute the series of processing in steps 200 to 208, 116 and 210 where the determination in step 108 is affirmative, corresponds to a "controller" according to the present application. Further, an engine required air flow rate Am corresponds to "first air flow rate" according to the present application, an air flow rate B0 corresponds to "second air flow rate" according to the present application, and a surge limit air flow rate BS corresponds to "third air flow rate" according to the present application.

The foregoing first and second embodiments describe an air supply operation that is performed taking as an object a time of receipt of a torque increase request that requests an engine torque in the supercharging range under circumstances in which the engine operating range is in the naturally aspirated range. The problem that a time period required in order to reach a requested engine torque lengthens due to the turbo-compressor 22a functioning as a restrictor when the throttle valve 34 is opened accompanying a torque increase request noticeably occurs in a situation where a request to increase torque from the naturally aspirated range to the supercharging range is made as described referring to FIG. 2 and FIG. 3 in the first embodiment. Accordingly, it is suitable to execute the air supply operation of the present application with respect to a time that a request to increase torque from the naturally aspirated range to the supercharging range is made. However, the air supply operation of the present application is not limited to a time that a torque increase request is made in the above described manner, and may also be executed at a time that a torque increase request to raise the engine torque within the naturally aspirated range is made.

Further, in the above described first and second embodiments, the air flow rate (Am−B0) or an air flow rate that is higher than the air flow rate (Am−B0) is utilized as the assist air flow rate C. By this means, a situation in which the turbo-compressor 22a functions as a restrictor can be avoided. However, even in an example where an air supply operation is executed utilizing the assist air flow rate C that is less than the air flow rate (Am−B0), in comparison to an example in which an air supply operation is not executed, an action that the pressure ratio of the turbo-compressor 22a at the start of the air supply operation is brought close to 1 can be obtained, and it can be said that a pressure loss of intake air that occurs in the turbo-compressor 22a can be lessened. Therefore, an air flow rate that is utilized in the "air supply operation" in the present application need not necessarily be the air flow rate (Am−B0) or an air flow rate that is larger than the air flow rate (Am−B0).

Further, in the above described first and second embodiments, a configuration is adopted in which an air supply operation is continuously executed during a period until the pressure of intake air (intake manifold pressure Pim) that is supplied to each cylinder at the time of increasing the engine torque accompanying a torque increase request rises to the atmospheric pressure Pa (see FIG. 5 or FIG. 9). However, it is sufficient that a period in which an air supply operation is executed in the present application includes at least one part of the above described period. The reason is that, even where the air supply operation is executed in one part of the above described period, by such execution it is possible to obtain, even though temporarily, an action that the pressure ratio of the turbo-compressor 22a at the start of the air supply operation is brought closer to 1 in comparison to a time when the air supply operation is not executed. Further, a configuration may also be adopted in which control of the execution period of the air supply operation is performed by, instead of executing the processing in step 116, executing processing that determines whether or not a predetermined time period (for example, 0.5 sec) that corresponds to a time period required for the operating point of the internal combustion engine 10 to pass through the naturally aspirated range at the time of an engine torque increase has passed.

Further, in an example performing the air supply operation in the above described first and second embodiments, in order to improve the response of the air supply by the electric compressor, it is conceivable to provide a bypass passage that connects the second intake passage 14b at a position that is on the upstream side of the electric compressor 28a with the second intake passage 14b at a position that is on a downstream side relative to the electric compressor 28a and is on an upstream side relative to the on/off valve 32, as well as a bypass valve that opens/closes the bypass passage, and to perform preliminary rotation control that, by actuating the electric compressor in a state in which the bypass valve is open, previously increases the speed of the electric compressor prior to starting an air supply operation. In an example where this kind of preliminary rotation control is being utilized, an operation to close the bypass valve and to also increase the speed of the electric compressor relative to the speed thereof during execution of the preliminary rotation control corresponds to an operation that starts the air supply operation in the present application.

Furthermore, in the above described first and second embodiments, where the required air flow rate Am is greater than the air flow rate B0, it is predicted that the pressure ratio of the turbo-compressor 22a is less than 1 where the throttle valve 34 is opened accompanying a torque increase request. However, a determination regarding whether or not the pressure ratio of the turbo-compressor is less than 1 where the throttle valve is opened accompanying a torque increase request may also be made, for example, according to the following method. That is, a configuration may be adopted so that the aforementioned prediction is made where the turbo speed at the time of a torque increase request is equal to or less than a specific turbo speed. The term "specific turbo speed" used here refers to a turbo speed at a time that, on the compressor map of the turbo-compressor 22a, the flow rate of air that passes through the turbo-compressor 22a is the required air flow rate Am and the pressure ratio is 1.

In the above described first and second embodiments, an example is described in which the air supply operation of the present application is applied to the internal combustion engine 10 that performs normally open control as the control of the WGV 40. In this respect, an internal combustion engine is known that performs normally closed control as the control of the WGV 40. The term "normally closed control" refers to fully closing the WGV 40 in an operating range on a low speed and low load side, and opening the WGV 40 in an operating range on a high speed and high load side on which the supercharging pressure of the turbo-compressor 22a becomes higher than a predetermined value. The air supply operation according to the present application may also be applied to an internal combustion engine that performs normally closed control as long as the circumstances are those under which it is predicted that the pressure ratio of the turbo-compressor will become less than 1 when the throttle valve is opened accompanying a torque increase request.

Further, the foregoing first and second embodiments are described taking as an example the configuration of the internal combustion engine 10 in which the turbo-compressor 22a and the electric compressor 28a are arranged in parallel in a form in which the turbo-compressor 22a is arranged in the first intake passage 14a and the electric compressor 28a is arranged in the second intake passage 14b that bypasses the first intake passage 14a. However, an internal combustion engine that is an object of the present application is not limited to an internal combustion engine that includes the intake passage 14 having the configuration in which both the upstream side and downstream side of the electric compressor 28a are connected to the upstream side and downstream side of the turbo-compressor 22a, respectively. That is, in an internal combustion engine that is an object of the present application, it is sufficient that at least the downstream side of a turbo-compressor and the downstream side of an electric compressor are connected, and accordingly the upstream sides of the turbo-compressor and the electric compressor may be configured to have intake passage inlets (atmospheric air inlet) that are mutually independent.

In addition, the foregoing first and second embodiments are described taking as an example the internal combustion engine 10 in which the throttle valve 34 is provided in the first intake passage 14a at a position on the downstream side relative to the position at which intake air from the turbo-compressor 22a and intake air from the electric compressor 28a converge. However, even if the position at which the throttle valve 34 is provided is not the above described position, it is possible for the turbo-compressor to function as a restrictor as a result of the throttle valve 34 being opened accompanying a torque increase request. Accordingly, a position at which the throttle valve is provided in the present application is not particularly limited as long as the position of the throttle valve is in the first intake passage.

Further, the foregoing first and second embodiments are described taking as an example the internal combustion engine 10 that is a spark-ignition engine. However, internal combustion engines as objects of the present application are not limited to spark-ignition engines, and can also include a compression-ignition engine (for example, a diesel engine) as long as the engine is one in which control that opens a throttle valve is performed where a torque increase request is made that requests an engine torque in a supercharging range under circumstances in which the engine operating range is in a naturally aspirated range. Furthermore, where an internal combustion engine of the present application includes a supercharging pressure control actuator that controls a supercharging pressure of a turbo-compressor, apart from a waste gate valve that opens/closes an exhaust bypass passage, for example, a variable nozzle device that is combined with a turbocharger also corresponds to such kind of supercharging pressure control actuator.

The invention claimed is:

1. A control apparatus for controlling an internal combustion engine, the internal combustion engine including:
   a first intake passage through which intake air taken into a cylinder flows;
   an exhaust passage through which exhaust gas from the cylinder flows;

a turbocharger having a turbine that is arranged in the exhaust passage and a turbo-compressor that is arranged in the first intake passage;

a second intake passage connected to a portion on a downstream side of the turbo-compressor in the first intake passage;

an electric compressor arranged in the second intake passage and configured to be driven by an electric motor; and a throttle valve configured to open and close the first intake passage, the control apparatus comprising a controller, the controller configured to:

open the throttle valve in a case where a torque increase request to increase an engine torque is made;

predict whether or not a pressure ratio of an outlet pressure with respect to an inlet pressure of the turbo-compressor will become less than 1 when the throttle valve is opened; and send a signal to an actuator to supply air from the second intake passage to the first intake passage using the electric compressor in a case where it is predicted that the pressure ratio will become less than 1, and to not to supply air in a case where it is predicted that the pressure ratio will not become less than 1.

2. The control apparatus according to claim 1, wherein the controller is configured, in a case where it is predicted that the pressure ratio will become less than 1, to perform the air supply operation so that the pressure ratio when starting the air supply operation becomes closer to 1 in comparison to the pressure ratio in a case where the air supply operation is not performed.

3. The control apparatus according to claim 1, wherein a flow rate of air that is supplied by the electric compressor when executing the air supply operation is obtained by subtracting a second air flow rate from a first air flow rate, wherein the first air flow rate is based on a product of an engine speed at a time of the torque increase request and a stroke volume of the cylinder, and wherein the second air flow rate is an air flow rate of the turbo-compressor when the pressure ratio becomes 1 under a speed of the turbo-compressor at the time of the torque increase request.

4. The control apparatus according to claim 1, wherein a flow rate of air that is supplied by the electric compressor when executing the air supply operation is greater than or equal to a value obtained by subtracting a second air flow rate from a first air flow rate, wherein the first air flow rate is based on a product of an engine speed at a time of the torque increase request and a stroke volume of the cylinder, and wherein the second air flow rate is an air flow rate of the turbo-compressor when the pressure ratio becomes 1 under a speed of the turbo-compressor at the time of the torque increase request.

5. The control apparatus according to claim 1, wherein a flow rate of air that is supplied by the electric compressor when executing the air supply operation is less than or equal to a value obtained by subtracting a third air flow rate from a first air flow rate, wherein the first air flow rate is based on a product of an engine speed at a time of the torque increase request and a stroke volume of the cylinder, and wherein the third air flow rate is a maximum air flow rate at which a surge occurs in the turbo-compressor under a speed of the turbo-compressor at the time of the torque increase request.

6. The control apparatus according to claim 1, wherein the controller is configured, in a case where a first air flow rate is greater than a second air flow rate, to predict that the pressure ratio will become less than 1 in a case where the throttle valve is opened, wherein the first air flow rate is based on a product of an engine speed at a time of the torque increase request and a stroke volume of the cylinder, and wherein the second air flow rate is an air flow rate of the turbo-compressor when the pressure ratio becomes 1 under a speed of the turbo-compressor at the time of the torque increase request.

7. The control apparatus according to claim 1, wherein the torque increase request is a request for an engine torque in a supercharging range under circumstances in which an operating range of the internal combustion engine is in a naturally aspirated range, and wherein the air supply operation is performed during a period including at least one part of a period during which a pressure of intake air that is supplied to the cylinder at a time of an increase in engine torque accompanying the torque increase request increases to atmospheric pressure.

* * * * *